(12) United States Patent
Zheng

(10) Patent No.: US 7,657,644 B1
(45) Date of Patent: Feb. 2, 2010

(54) METHODS AND APPARATUS FOR STREAMING MEDIA MULTICAST

(75) Inventor: Qinghua Zheng, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 542 days.

(21) Appl. No.: 10/144,454

(22) Filed: May 10, 2002

(51) Int. Cl.
*G06F 15/16* (2006.01)

(52) U.S. Cl. .................................................. 709/231

(58) Field of Classification Search ......... 709/217–219, 709/226, 246, 231, 249; 455/503; 395/200.61; 711/118; 370/248
See application file for complete search history.

(56) References Cited

U.S. PATENT DOCUMENTS

| | | | |
|---|---|---|---|
| 5,043,885 A | | 8/1991 | Robinson |
| 5,583,561 A | * | 12/1996 | Baker et al. .................... 725/93 |
| 5,586,264 A | | 12/1996 | Belknap et al. |
| 5,615,362 A | | 3/1997 | Jensen et al. |
| 5,737,747 A | | 4/1998 | Vishlitzky et al. |
| 5,778,187 A | * | 7/1998 | Monteiro et al. ............ 709/231 |
| 5,799,185 A | | 8/1998 | Watanabe |
| 5,854,887 A | | 12/1998 | Kindell et al. |
| 5,893,091 A | * | 4/1999 | Hunt et al. ....................... 707/3 |
| 5,918,020 A | | 6/1999 | Blackard et al. |
| 5,960,452 A | | 9/1999 | Chi |
| 6,029,200 A | * | 2/2000 | Beckerman et al. .......... 709/226 |
| 6,085,193 A | | 7/2000 | Malkin et al. |
| 6,275,471 B1 | * | 8/2001 | Bushmitch et al. .......... 370/248 |
| 6,351,471 B1 | | 2/2002 | Robinett et al. |
| 6,351,474 B1 | | 2/2002 | Robinett et al. |
| 6,366,970 B1 | | 4/2002 | Wolff et al. |
| 6,407,680 B1 | | 6/2002 | Lai et al. |
| 6,463,508 B1 | | 10/2002 | Wolf et al. |
| 6,484,212 B1 | | 11/2002 | Markowitz et al. |
| 6,505,169 B1 | | 1/2003 | Bhagavath et al. |
| 6,516,361 B2 | | 2/2003 | Lym et al. |
| 6,593,860 B2 | | 7/2003 | Lai et al. |
| 6,594,751 B1 | | 7/2003 | Leivent |
| 6,665,755 B2 | | 12/2003 | Modelski et al. |
| 6,704,576 B1 | * | 3/2004 | Brachman et al. ........... 455/503 |
| 6,708,213 B1 | | 3/2004 | Bommaiah et al. |
| 6,721,850 B2 | | 4/2004 | Hofmann et al. |

(Continued)

OTHER PUBLICATIONS

Kasera, Hjalmtysson, Towsley, and Kurose, Jun. 2000, IEEE, IEEE/ACM Transactions on Networking, vol. 8, No. 3.*
ftp://ftpeng.cisco.com/ipmulticast/drafts/draft-ietf-idmr-igmp-v3-04.txt IETF, Internet Draft—IETF, IGMPv3, Jun. 2000.*
Microsoft, Internet Explorer 4 Resource Kit, Microsoft Press, Feb. 1998, Chapter 19—NetShow. (obtained via Microsoft TechNet).*

(Continued)

*Primary Examiner*—Andrew Caldwell
*Assistant Examiner*—Grant Ford
(74) *Attorney, Agent, or Firm*—Perkins Coie LLP

(57) ABSTRACT

A method for a cache for providing streaming media data to a client system includes receiving a request from a client system for a media meta file, the media meta file comprising a unicast URL for a stream of media data, retrieving the media meta file, initiating a connection with a media server associated with the unicast URL, selecting a multicast channel for broadcast of the stream of media data, modifying the media meta file to include data associated with the multicast channel to form a modified media meta file, sending the modified media meta file to the client system, receiving the stream of media data from the media server, and providing the stream of media data on the multicast channel. The client system receives the stream of media data on the multicast channel.

20 Claims, 13 Drawing Sheets

U.S. PATENT DOCUMENTS

| | | |
|---|---|---|
| 6,742,082 B1 | 5/2004 | Lango et al. |
| 6,744,763 B1 | 6/2004 | Jones et al. |
| 6,747,991 B1 | 6/2004 | Hemy et al. |
| 6,751,673 B2 * | 6/2004 | Shaw .......................... 709/231 |
| 6,760,765 B1 | 7/2004 | Asai et al. |
| 2001/0003193 A1 | 6/2001 | Woodring et al. |
| 2001/0029525 A1 * | 10/2001 | Lahr .......................... 709/218 |
| 2001/0034786 A1 | 10/2001 | Baumeister et al. |
| 2002/0029282 A1 | 3/2002 | Buddhikot et al. |
| 2002/0097750 A1 | 7/2002 | Gunaseelan et al. |
| 2002/0116473 A1 | 8/2002 | Gemmell |
| 2002/0116585 A1 | 8/2002 | Scherr |
| 2002/0162047 A1 | 10/2002 | Peters et al. |
| 2002/0181506 A1 | 12/2002 | Loguinov |
| 2003/0005452 A1 | 1/2003 | Rodriguez |
| 2003/0217113 A1 | 11/2003 | Katz et al. |
| 2004/0039837 A1 | 2/2004 | Gupta et al. |
| 2006/0031557 A1 * | 2/2006 | Walsh et al. ................ 709/232 |
| 2006/0047774 A1 | 3/2006 | Bowman et al. |
| 2008/0095339 A1 | 4/2008 | Elliott et al. |

OTHER PUBLICATIONS

Jason Meserve, Apr. 16, 2001, Network World, Net Appliance offers content delivery, pp. 1-2.*

NetCache™ 5.1 Web Cache First-Time Configuration Guide, Network Appliance, Inc., Sunnyvale, California, Apr. 2001.

NetCache™ 5.1 Routine Administration Guide, Network Appliance, Inc., Sunnyvale, California, Apr. 2001.

NetCache™ 5.1 Configuration Guide, Network Appliance, Inc., Sunnyvale, California, Apr. 2001.

NetCache™ 5.1 Deployment Planning Guide, Network Appliance, Inc., Sunnyvale, California, Apr. 2001.

NetCache™ 5.1 Features and Configuration Planning Guide, Network Appliance, Inc., Sunnyvale, California, Apr. 2001.

NetCache™ 5.1 Streaming Media Cache First-Time Configuration Guide, Network Appliance, Inc., Sunnyvale, California, Apr. 2001.

NetCache™ 5.1 Accelerator First-Time Configuration Guide, Network Appliance, Inc., Sunnyvale, California, Apr. 2001.

* cited by examiner

US 7,657,644 B1

METHODS AND APPARATUS FOR STREAMING MEDIA MULTICAST

CROSS-REFERENCES TO RELATED APPLICATIONS

The present invention disclosure incorporates by reference for all purposes co-pending U.S. patent application Ser. No. 09/981,328, filed Oct. 16, 2001 and co-pending U.S. patent application Ser. No. 09/981,667, filed Oct. 16, 2001.

BACKGROUND OF THE INVENTION

The present invention relates to streaming media. More particularly, the present invention relates to methods and apparatus for broadcasting of streaming media with reduced server-cache bandwidth consumption and increased performance.

A variety of approaches have previously been used to deliver live streaming media data to multiple client systems at the same time. One technique for broadcasting streaming media to multiple clients is known as a Unicast broadcast model. This technique can be used without requiring special hardware and software.

Drawbacks to the unicast model include that this technique can consume costly server bandwidth, because for each client that requests a stream, the server has to deliver a copy of the data stream. As example, if the server provides a stream of data to each of K client systems and if each stream requires the server to use bandwidth B, the server would consume at least B*K bandwidth.

Another technique for broadcasting live streaming media data to multiple client systems is a "Multicast" model. This techniques requires the use of intermediary routers/switches that support multicast. In this case, when more than one client requests the same stream of data, the intermediary router receives a stream from the server, replicates the streaming media data for each client system, and outputs the stream to each client on a multicast channel. In contrast to the above model, the server consumes bandwidth B for broadcasting the stream to the intermediary router.

Drawbacks to the multicast broadcast model includes that the server must know whether or not intermediary routers and switches support multicasting. For example, the server must be aware of the network configuration between the server and the client system. Such knowledge of network configuration for different client systems across the web is virtually impossible.

In light of the above, what is required are improved methods and apparatus for broadcasting streaming media to client systems with reduced bandwidth requirements. Further, what is required are methods and apparatus for providing such solutions in economical ways.

BRIEF SUMMARY OF THE INVENTION

The present invention relates to streaming media broadcasting. More particularly, the present invention relates to methods and apparatus for converting one type of streaming media broadcast type to another type advantageously.

Embodiments of the present invention may be used to receive requests for streams of media data from client systems that specify a unicast broadcast model. In response, the embodiments request a unicast broadcast from an upstream media server, and sends received data to the client system using a multicast broadcast model. In effect, a client system broadcast is converted from a unicast broadcast to a multicast broadcast. When additional client systems also request the unicast broadcast from the upstream media server, such client systems are included into the multicast.

In a typical example, a media server and streaming clients are provided in a multicast-enabled network in which streaming clients can receive multicast traffic sent from a media server. However, this may not always be possible. For example, an international financial institution who has many regional offices across the world may need to regularly send real time live stream to all its regional offices from its headquarters. In this situation, streaming clients at various regional office will not be able to receive multicast traffic directly from the media server which is usually located at its headquarters. Embodiments of the present invention bring a media server closer to streaming clients located at remote offices. In operation, when a streaming client at a regional office makes a multicast streaming request to the central media server, the request is routed to the nearest embodiment of the present invention (streaming media cache) at the edge of the same regional local network. The edge media cache then connects to the central media server located at the headquarter via unicast streaming (or other upstream media server) and multicasts out received data to all streaming clients in the same regional office. In this way, a live stream can be delivered reliably to all regional offices and network bandwidth usage between the central server and each regional office will not explode as more and more clients make the same streaming request.

In the present disclosure "Streaming media" data (also data stream, stream, or the like) generally refers to media intended to be transported at a select (often, subscribed) bit rate, and with a desired timeliness. The streaming media is adapted for playback in a desired order without regard to the order the streaming media data are received by a client system. Streaming media generally conforms to a real-time delivery protocol, such as, e.g., RTSP, RTP, or the like. The media (media clip) represented in the streaming media data may include static images, video data, audio data, executable files, presentation data, applet data, data files, and the like.

According to one aspect of the invention, a method for a cache for providing streaming media data to a client system is described. One technique includes receiving a request from a client system for a media meta file, the media meta file comprising a unicast URL for a stream of media data, retrieving the media meta file, and initiating a connection with a media server associated with the unicast URL. Additional methods may include selecting a multicast channel for broadcast of the stream of media data, modifying the media meta file to include data associated with the multicast channel to form a modified media meta file, and sending the modified media meta file to the client system. Some techniques include receiving the stream of media data from the media server, and providing the stream of media data on the multicast channel. Typically, the client system receives the stream of media data on the multicast channel.

According to another aspect of the invention, a streaming media cache configured to provide streaming media data to a client system is disclosed including a processor, and a tangible memory coupled to the processor. The tangible memory may include code that directs the processor to detect a request from a client system for a media meta file, the media meta file comprising a specification of a unicast address for a stream of media data, code that directs the processor to retrieve the media meta file, and code that directs the processor to initiate a connection with an upstream media source associated with the unicast address. The tangible memory may also include code that directs the processor to select a multicast channel for broadcast of the stream of media data, code that directs the processor to form a modified media meta file from the media meta file to include data associated with the multicast channel, and code that directs the processor to send the modified media meta file to the client system. Code that directs the processor to receive the stream of media data from the media server, and code that directs the processor to provide the stream of media data on the multicast channel may also reside on the tangible memory. The tangible memory may include a computer hard-disk, computer memory, an optical memory, a non-volatile memory, and others.

According to yet another aspect of the invention, a method for receiving streaming media data in a client system is described. One process includes sending a request for a media meta file, the media meta file comprising a specification of a unicast address for a stream of media data, receiving a responsive media meta file from a streaming media cache, the responsive media meta file including a specification of a media station file, wherein the streaming media cache forms the responsive media meta file, and sending a request for the media station file to the streaming media cache, the media station file comprising a specification of a multicast address for the stream of media data, wherein the streaming media cache determines the multicast address. Additional processes may also include receiving the media station file from the streaming media cache, and receiving the stream of media data on the multicast address, wherein the streaming media cache outputs the stream of media data to the multicast address, wherein the streaming media cache receives the stream of media data from an upstream media source, in response to the unicast address.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
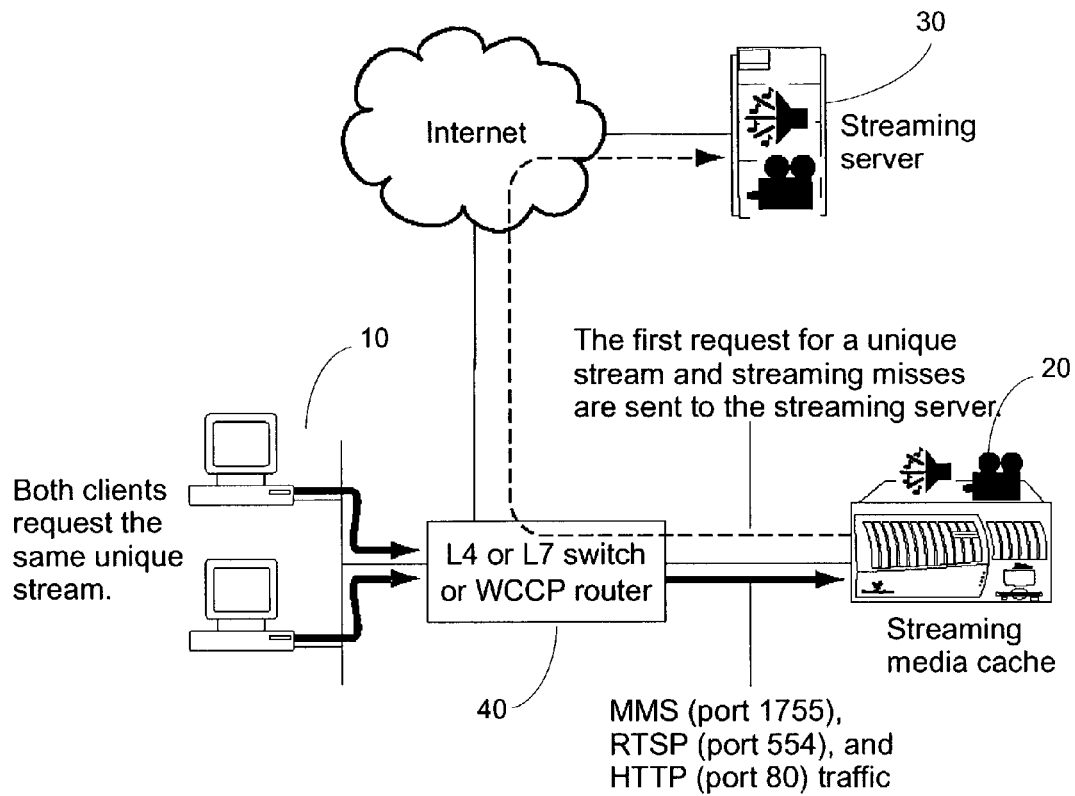
FIGS. 1A-C illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media. For example, a request for a file with a suffix of .asx, .asf, .nsc, .rm, .ram, or the like.

If such a request is determined by router 40, that request is redirected to streaming media cache 20, and not media data server 30. Once streaming media cache 20 receives the request, it makes a determination whether the stream (the media clip) or the requested portion of the stream (the request portion of the media clip) has already been cached. If the data has been previously stored, streaming media cache 20 provides the streaming media to client system 10. In embodiments of the present invention, streaming media cache 20 is also a web proxy cache that handles http requests in addition to the streaming media files. In alternative embodiments, a separate web proxy cache may be used.

In the present embodiment, if the data (requested portion of a stream) has not previously been stored in streaming media cache 20, as when the data is "live" data, streaming media cache 20 sends a request to media server 30 for the live stream of data. As the live stream of data is delivered to streaming media cache 20, it is forwarded to client system 10, and the portion of the stream of data is stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

Figure 1B:
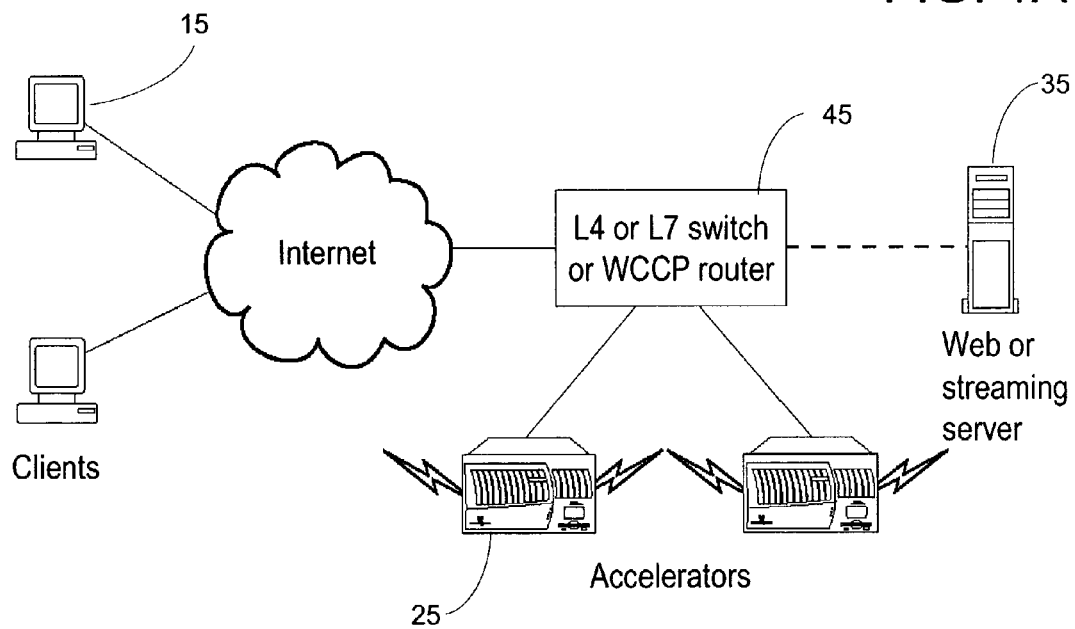

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B FIG. 1B illustrates a overview diagram according to another embodiment of the present invention. In particular, FIG. 1B includes a client system 15, a streaming media cache 25, media data server 35 (streaming server), and a router 45. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 45. Router 45 may be embodied as a layer 4 or layer 7 switch, a WCCP router, or any other conventional switch or router. In this embodiments, router 45 would be configured to recognize when a request is made by client system 15 for a stream of streaming media.

If such a request is determined by router 45, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 15.

In the present embodiment, if the data is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail in the applications cited above.

For this embodiment, the streaming media traffic is sent by media cache 25 to specific ports. In specific embodiments, for RealSystem streaming media, media cache 25 sends streaming media via TCP on port 554; for QuickTime (RTSP) streaming media, media cache 25 sends streaming media via TCP on port 554 and/or via UDP on port 2001; for Microsoft Media Streaming (MMS) streaming media, media cache 25 sends streaming media data via TCP on port 1755; and for HTTP streaming media, media cache 25 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 1C:
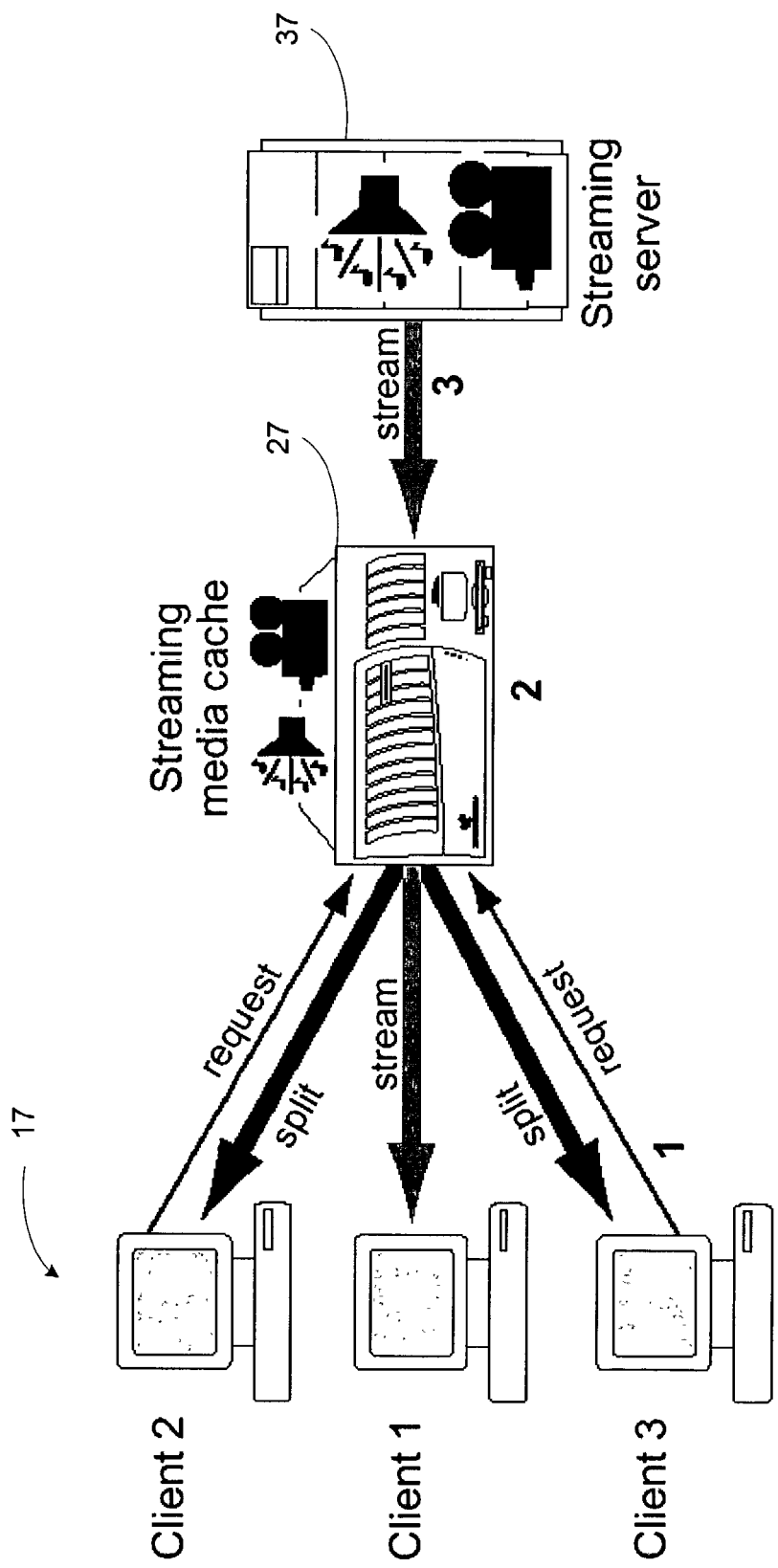

FIG. 1C illustrates another embodiment of the present embodiment. In particular, FIG. 1C illustrates an embodiment where a "live" stream of data is delivered to multiple client systems. FIG. 1C illustrates a streaming media server 37, a streaming media cache 27, and a series of client systems 17.

In this embodiment, streaming media cache 27 is used to provide "live" streaming media data received from streaming media server 37, or the like, to client systems 17. It should be understood that streaming media server 37 may itself be an "upstream" streaming media cache, or other source of "live" streaming media data.

In these embodiments "live" data may be real-time data, such as a audio and/or video webcast of a live performance. In other embodiments "live" data may be data that is to be a controlled or "coordinated" webcast at a particular time, even though the data is pre-recorded. For example, the "live" data may represent a time-shifted event, a pay-per-view event, a scheduled program, or the like. As examples, "live" data streams may represent a world-wide corporate press release, a full-length movie, a censor-delayed webcast, and the like. Accordingly, "live" data streams in these embodiments refer to data streams that are to be substantially simultaneously delivered to multiple client systems.

As illustrated in FIG. 1C, a first client system may be receiving the live stream of data via streaming media cache 27. Later, a second and third client systems may request the same live stream of data. In this case, in response to the second and third client requests, the live stream that the first client is being sent, is split and sent to the second and third clients. Thus, if the second and/or third requests are made 10 minutes after the live stream of data starts, the second and third clients miss the first 10 minutes, and begin receiving the live stream at that point (e.g. 10 minutes into the stream).

In the present embodiments, streaming media cache 27 may be a cache such as cache 25 on the "edge" of a POP network as illustrated in FIG. 1B or a local cache such as cache 20 illustrated in FIG. 1A. In such embodiments, cache 27 provides "live" streaming media data to client systems 17, cache 27 stores the "live" streaming media data and cache 27 rebroadcasts the streaming media data to client systems 17 at a later time. For example, streaming media cache 27 streams a live press conference to client systems 17 and at the same time stores it in local disk memory. At a later time or date, when a user at a client system wishes to view or hear the press conference as was originally broadcast. Streaming media cache 27 retrieves the locally cached copy of the press conference and streams it to the user. Efficient methods for implementing such functionality is disclosed in the applications cited above.

Figure 2:
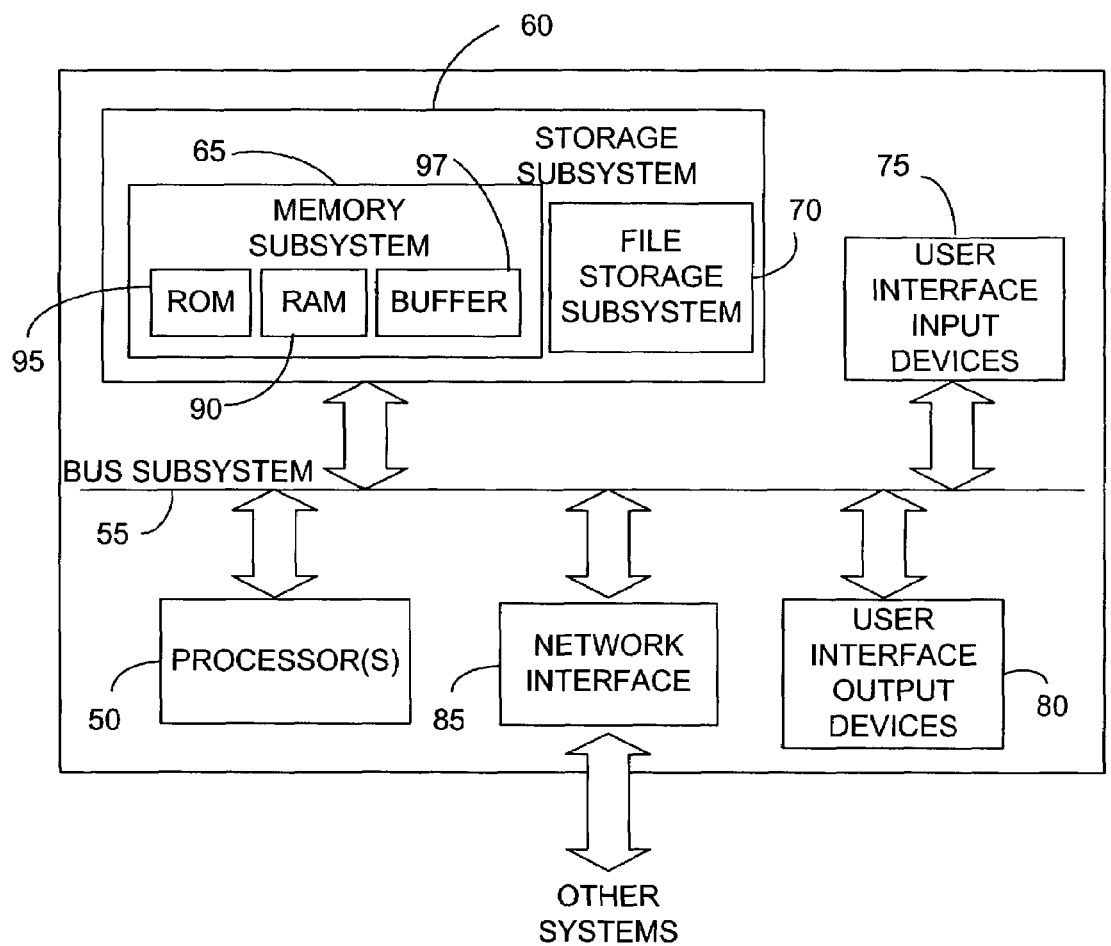
FIG. 2 is a simplified block diagram of a computer system according to an embodiment of the present invention.

FIG. 2 is a simplified block diagram of a computer system 49 according to an embodiment of the present invention. Computer system 49 may be used as client system 10, streaming media cache 20, and/or media data server system 30. Computer system 49 may be a stand-alone computer system, a computer "appliance," or the like.

As shown in FIG. 2, computer system 49 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 49. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 85 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 49.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 49.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor(s) 50 of computer system 49. In a distributed environment, the software modules may be stored on a plurality of computer systems and executed by processors of the plurality of computer systems. Storage subsystem 60 may also provide a repository for storing various databases that may be used to store information such as a cache entry hash table. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 for storage of instructions and data during program execution and a read only memory (ROM) 95 in which fixed instructions are stored. RAM 90 is typically also used for execution of programs, storage of data, and the like.

File storage subsystem 70 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. The type of data may include streaming media payload data.

In the present embodiment, computer system 49 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 49 communicate with each other as intended. The various subsystems and components of computer system 49 need not be at the same physical location but may be distributed at various locations within a network. Although bus subsystem 55 is shown schematically as a single bus, alternative embodiments of the bus subsystem may utilize multiple busses.

Computer system 49 itself can be of varying types including a personal computer, a portable computer, a workstation, a computer terminal, a network computer, a mainframe, a kiosk, a personal digital assistant (PDA), a wireless communication device such as a cell phone, an entertainment console (PS2, X-box) or any other data processing system. Due to the ever-changing nature of computers and networks, the description of computer system 49 depicted in FIG. 2 is intended only as a specific example for purposes of illustrating an embodiment of the computer system.

In one embodiment, computer system 49 may be configured as a "network cache" that provides clients access to media data streams stored in its "in-core" memory, i.e., random-access memory (RAM), or media data streams stored on one or more mass storage devices (e.g., disks) associated with the network cache. For instance, the server may be a NetCache® device made by Network Appliance, Inc. of Sunnyvale, Calif., an appliance that manages file access requests for information stored in a computer's in-core memory. The NetCache® family of products currently includes the NetCache® C1100, NetCache® C3100, and NetCache® C6100 including proprietary, but available hardware and software. Embodiments of the present invention may also be implemented in future additions to the NetCache® family of products.

It will be readily apparent to one of ordinary skill in the art that many other hardware and software configurations are suitable for use with the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowsXP™ WindowsNT™ from Microsoft, Solaris from Sun Microsystems, LINUX, UNIX, MAC OS X™ from Apple Computer Corporation, and the like. Many other configurations of a computer system are possible having more or fewer components than the computer system depicted in FIG. 2.

Figure 3:
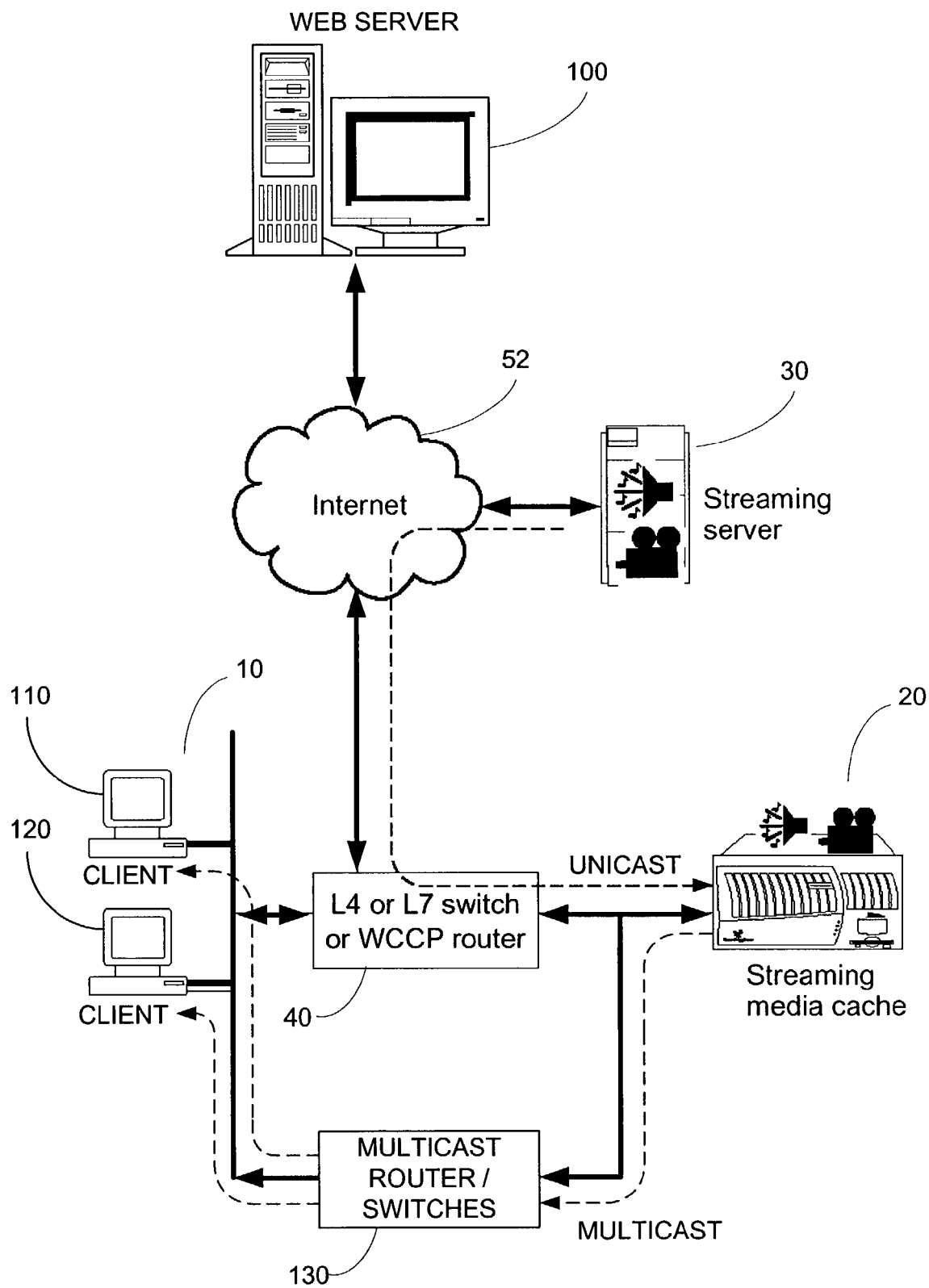
FIG. 3 illustrates another overview diagram according to another embodiment of the present invention.

FIG. 3 illustrates another overview diagram according to another embodiment of the present invention. This embodiment includes similar elements as was described in FIG. 1. Additionally, as shown, client systems 110 and 120 are also coupled via multicast router/switch 130 to streaming media cache 20. Further, router 40 is coupled via a wide area network 52 to web server 100.

In this embodiment, web server 100 stores typical web pages. Certain web pages may include links or references to media meta files. In the present embodiment, such media meta files specify unicast streaming media sources encoded in Windows streaming media format, Real Networks streaming media format, or the like. In typical embodiments, the links specify pathnames (network locations) of media meta files having an .asx suffix, a .rm suffix, or the like.

In one embodiment of the present invention, web server 100 may also store the media meta file, however, in other embodiments, the media meta file may reside upon a different server. The media meta file typically includes information that a media player in a client system uses to connect to and play a stream of media. Such media meta files may include a title of the streaming media, the author, a copyright reference, a pathname (network location) of the streaming media. As examples, the location may be a URL such as: "mms://mediaserver/dir/live.asx"; "rtsp://realserver/example.rm"; or the like. In the present embodiment, the network location of the streaming media is initially streaming media server 30.

As described in the background, under the unicast broadcast model, each client system maintains a distinct connection to the media source when receiving streaming media data. Accordingly, the media server must support each client system that desires the stream of media data.

FIG. 3 also illustrates a multicast router/switch 130. Such routers/switches are known in the industry to receive a single stream of media data and to replicate the stream (multicast) to one or more client systems 10. In the present embodiment, as will be discussed, streaming media cache 20 first determines a multicast port for streaming media data. Next, multicast router 130 receives the streaming media data and the specification of the multicast port, and outputs the streaming media data to the selected multicast channel and port. Client systems 10 that monitor the multicast channel port then receive the streaming media data.

Figure 4A:
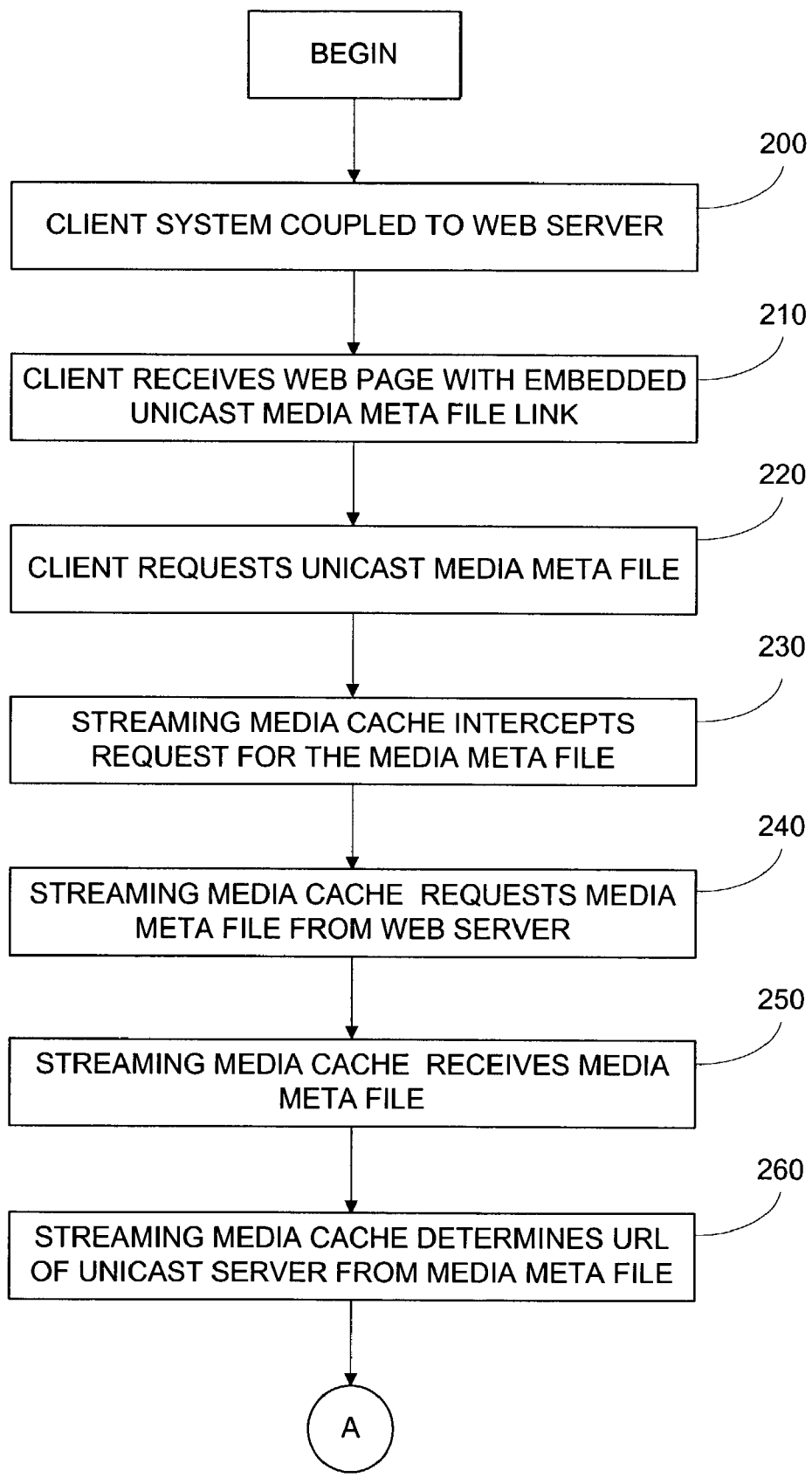
FIGS. 4A-C illustrate a flow diagram according to an embodiment of the present invention.
Figure 4B:
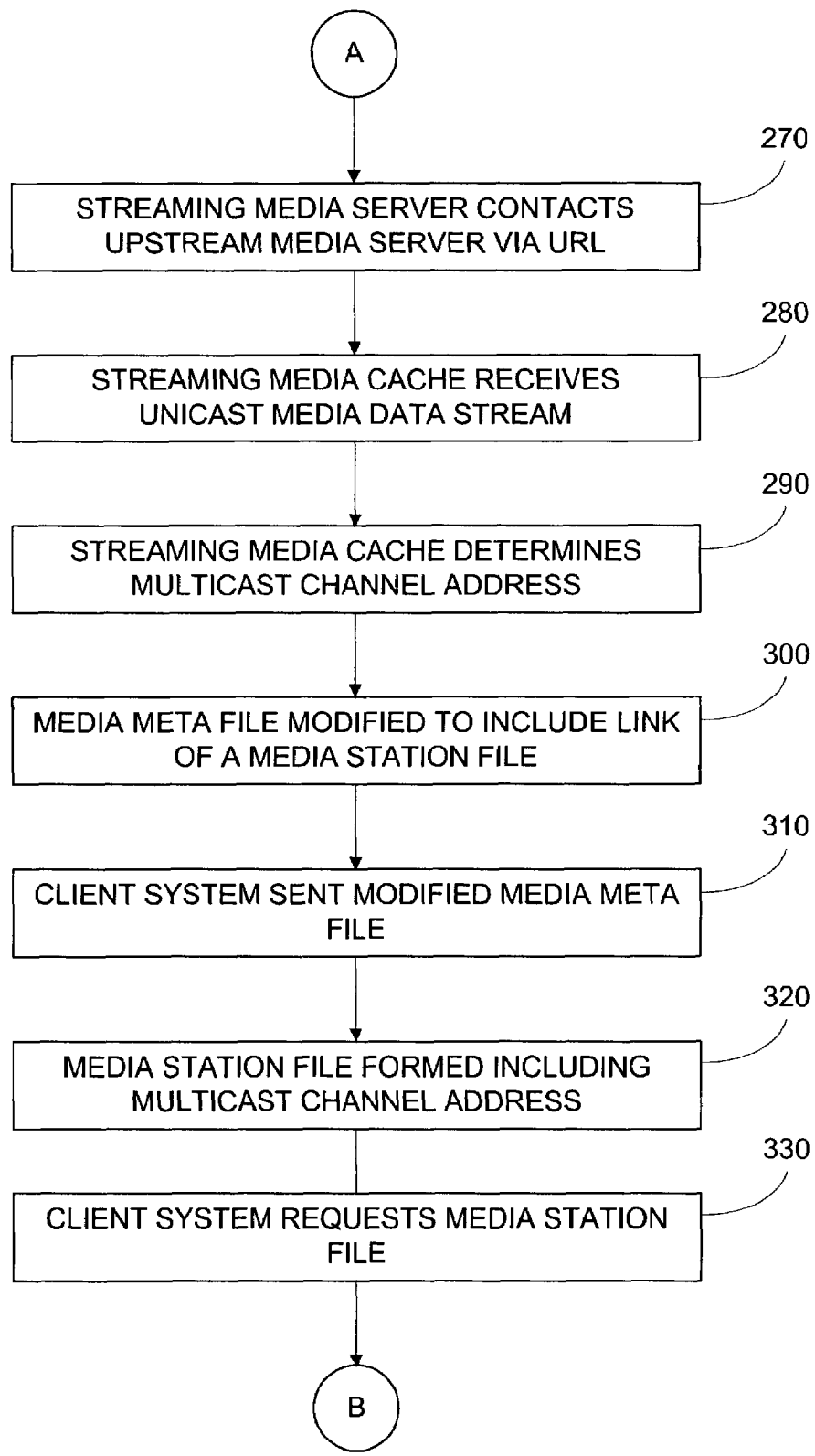
Figure 4C:
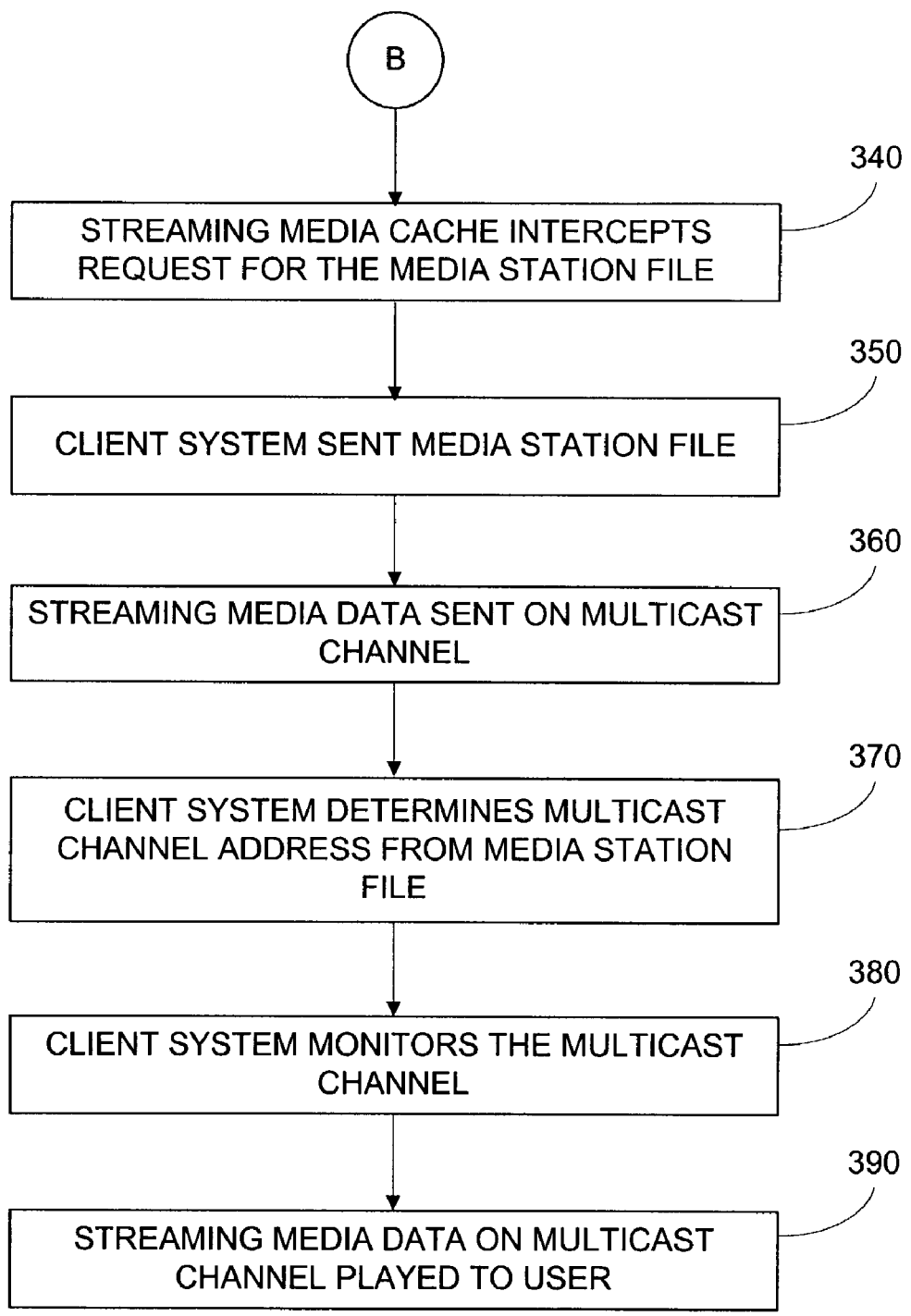

FIGS. 4A-C illustrate a flow diagram according to an embodiment of the present invention.

Initially, client system 110 requests a web page hosted by web server 100, step 200. As is conventional, the user may type-in a URL, or click on a link to request the web page. In response, web server 100 provides the web page to client system 110 for display, typically via a browser on client system 110, step 210. In this embodiment, the web page may include a link to a media meta file. As an example, a user at client system 110 may be invited to click on the media meta file link to view the top stories of the day, or the like. In this embodiment, the link may be to an "announcement file" or "stream redirector file" that includes data for a unicast broadcast. Such links may include file extensions of .asx, .rm or the like. For example, the link may be similar to the following: http://webserver/live.asx. If the user wishes to view the streaming media, the user clicks upon the link to the media meta file, step 220.

In this embodiment, router 40 intercepts the request for the media meta file, and forwards the request to streaming media cache 20 and not directly to web server 100, step 230. In this example, a priori, router 40 is configured to route requests for media meta files, and other streaming media related files to streaming media cache 20. Router 40 may be programmed to do this by being programmed to look for the desired file types (e.g. .asx, .rm, .nsc). Also, in this example, streaming media cache 20 may be configured as a web proxy that intercepts http requests. In response, streaming media cache 20 generates a request for the media meta file from web server 100, step 240. In other embodiments, the media meta file may be resident on other servers than web server 100, such as another streaming media cache or other up stream server.

In the present embodiment, web server 100, or another server, provides the media meta file back to streaming media cache 20, step 250. In one example, the media meta file is an announcement or stream redirector file such as a Windows .asx file, that specifies data including authorship, copyright, duration, stream parameters, and the like. Additionally, this media metafile typically also includes a link (URL) to the stream of media data. In one embodiment, the link is to a unicast Windows .asf file. The link may be similar to the following: mms://mediaserver/live.asf. In another example, the media meta file is a Real Networks meta file: a .rm file and the link may be similar to the following: pnm://realserver/live.ram.

In this embodiment, streaming media cache 20 parses the media meta file for the URL of the unicast stream of media data, step 260. Based upon the URL of the unicast stream, streaming media cache 20 invokes the link to contact streaming media server 30 and request the stream of media data, step 270. In other embodiments, the stream of media data need not be retrieved from streaming media server 30, but may be retrieved from an intermediary streaming media cache, or the like. Accordingly, generally, streaming media cache 20 retrieves the stream of media data from upstream data sources. When streaming media cache 20 begins receiving the unicast streaming media, step 280, streaming media cache 20 may store the media, as described in the above referenced applications.

In the present embodiment, after streaming media cache 20 has successfully begun receiving the unicast stream from streaming media server 30, streaming media cache 20 determines or selects a multicast IP channel and port for broadcast of the streaming media data, step 290. Next, streaming media cache 20 modifies the media meta file (e.g. .asx or .rm file) received from web server 100 to form a modified media meta file, step 300.

As an example a reference to a multicast media station file is shown below:
  <asx version="3.0">
  <entry>
    <ref href="mms://parvo.lab.netapp.com/McastStation1"/>
  </entry>
  </asx>

In the present embodiment, the link (URL) of the unicast stream of media data is replaced with a link to a multicast or "media station" file. One example of a media station file is a Microsoft .nsc file. For example, the media meta file (.asx) is modified to add a link to a multicast media station (.nsc) file. In an additional embodiment, the link to the unicast file may be removed.

As an example, the above .asx file is modified to become:
  <asx version="3.0">
  <entry>
    <ref href=http://parvo.lab.netapp.com/McastStation1/NeTcAcHe.nsc"/>
    <ref href="mms://parvo.lab.netapp.com/McastStation1"/>
  </entry>
  </asx>

Other similar examples of a multicast file are also contemplated. In this embodiment, streaming media cache 20 sends the modified meta file to client system 110, step 310.

In the present flow diagram, the actual media station file (e.g. .nsc file) is formed and stored within streaming media cache 20 before or after the step above or in response to the step below, step 320. In this example, media station file includes data required for the media player on a client system to connect to a multicast stream of media data. For example, a Windows .nsc file may include data such as the multicast IP address, port, stream format, and the like.

In response to the modified media meta file, client system 110 parses the meta file (e.g. .asx), determines the link for the multicast media station file (.nsc), and then makes an http requests for the multicast media station file, step 330.

Next, router 40 forwards the client system request to streaming media cache 20, step 340. Similar to the above, a priori, router 40 is configured to route requests for multicast media station files, and other streaming media related files to streaming media cache 20 based upon file types, or the like. In response, streaming media cache 20 provides the media station file, discussed above, to client system 110, step 350.

In a typical embodiment, the content of an NSC file contains base64-encoded information about the multicast live stream the client is about to join and receive data from. An example of a reference to a multicast media station file is shown (in ascii) below for the following media meta file: http://web.netapp.com/~zheng/McastStation1.nsc
  [Address]
  Time To Live=5
  Distribution Limit=5
  Player URL=http://codecs.microsoft.com/isapi/mpupgrade.dll
  Player Version=4.0.1.3850
  NSC Format Version=3.0
  Channel Version=15
  Name=McastStation1
  IP Address=233.51.78.231
  IP Port=5000
  Unicast URL=mms://PARVO/McastStation1
  Delivery Mode=0xA
  NSC URL=http://PARVO/McastStation1.nsc
  Multicast Adapter=
  Log URL=
  [Description]
  Description=Multicast Station 1
  Contact Address=
  Contact Phone=
  Contact E-mail=
  Auto Archive=0
  [Formats]
  Format1= . . . (asf file header information)
  Description1=mmsAVMbrLo15min.asf In the present embodiment, streaming media cache 20 provides the streaming media data received from streaming media server 30 (the upstream media source) onto the multicast IP address, step 360. In response, multicast router 130 provides the streaming media data to any client system that subscribes to the particular IP address.

In this example, client system 110 determines the multicast IP address, port, and other data required to receive the multicast from the media station file (e.g. .nsc file), step 370. Client system 110 then monitors the specified multicast IP address, port, and the like to receive the multicast streaming media data from multicast router 130, step 380. The received streaming media data is then typically played to the user, step 390. In the present embodiment, a number of different client-side media players may be used to play the streaming media data, including the Windows Media Player, RealNetworks RealPlayer, or the like.

Figure 5A:
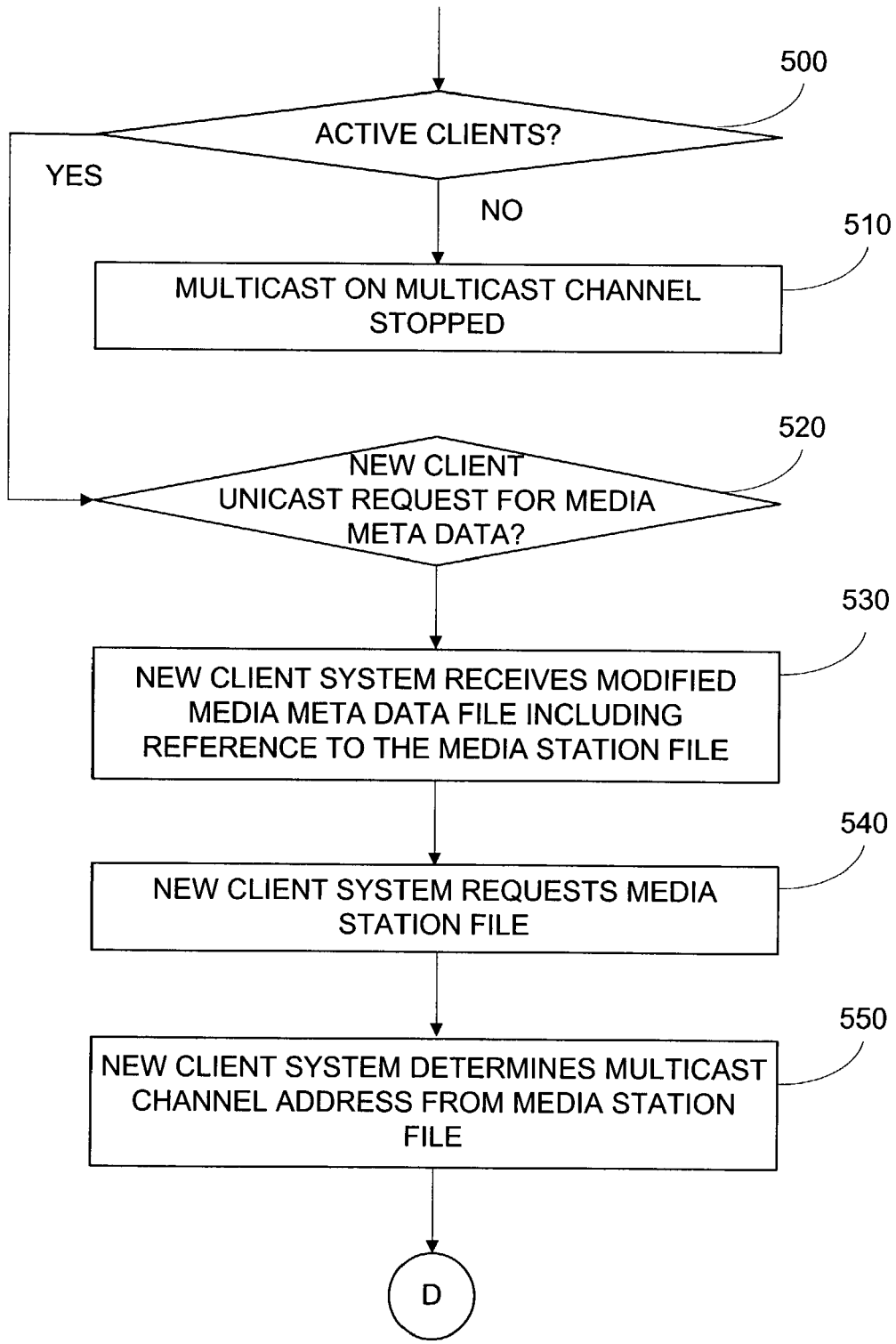
FIGS. 5A-B illustrate a flow diagram according to an embodiment of the present invention.
Figure 5B:
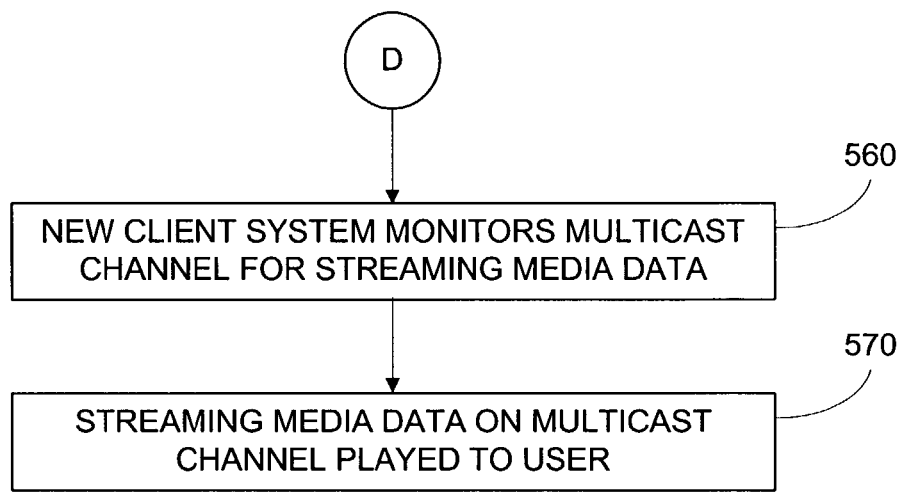

FIGS. 5A-B illustrate a flow diagram according to an embodiment of the present invention. In particular, these figures illustrate additional steps that may be performed after the flow diagram in FIGS. 4A-C.

After streaming media cache 20 begins providing the streaming media data onto the multicast IP address, streaming media cache 20 determines whether client system 110, or other client systems are still monitoring the multicast IP address, step 500. In other words, streaming media cache 20 determines whether any client systems are viewing the multicast streaming media data. In one embodiment of the present invention, streaming media cache 20 may utilize standardized protocols, such as Internet Group Management Protocol (IGMP) to periodically query client systems that have joined the multicast channel. In other embodiments, other ways of communicating with the client systems are also contemplated.

In this embodiment, if no client systems are monitoring the multicast IP address, streaming media cache 20 stops sending the streaming media data on the specified multicast IP address, step 510. For example, if no client system responds to the IGMP query from streaming media cache 20, streaming media cache 20 terminates the multicast. Additionally, in various embodiments, streaming media cache 20 also terminate the unicast from streaming media server 30. Both such actions act to reduce the use of network bandwidth advantageously. In this example, while at least one client is still receiving the multicast, the multicast continues.

While multicasting in response to a first client unicast request, a second client may wish to receive the same unicast, step 520. For example, after FIGS. 4A-C, above, while streaming media cache 20 provides a multicast of the streaming media data to client system 110, a user at a client system 120 may also request the same unicast streaming media data. In one example, client system 120 may do this by specifying or requesting the same media meta file (e.g. .asx, .rm) as mentioned in step 220, above.

In response to the request from client system 120, streaming media cache 20 provides the modified media meta file to client system 120, step 530. Typically, the modified media meta file is the same one discussed in step 310, above. For example, the modified media meta file includes the link to the media station file (e.g. .nsc file). In other embodiments, different modified media meta files may be generated and sent to different client systems.

Similar to the process described above, in response to the modified media meta file, client system 120 requests the media station file (e.g. .nsc file), step 540, and streaming media cache 20 provides the media station file to client system 120, step 550. In this example, the media station file may be similar, if not the same, to the media station file discussed in step 350, above. In response to the media station file, client system 120 typically monitors the same port as client system 110, step 560, and outputs streaming media data to the user, step 570. In other embodiments, other multicast IP addresses, ports, and the like may be specified by the media station file.

Figure 6:
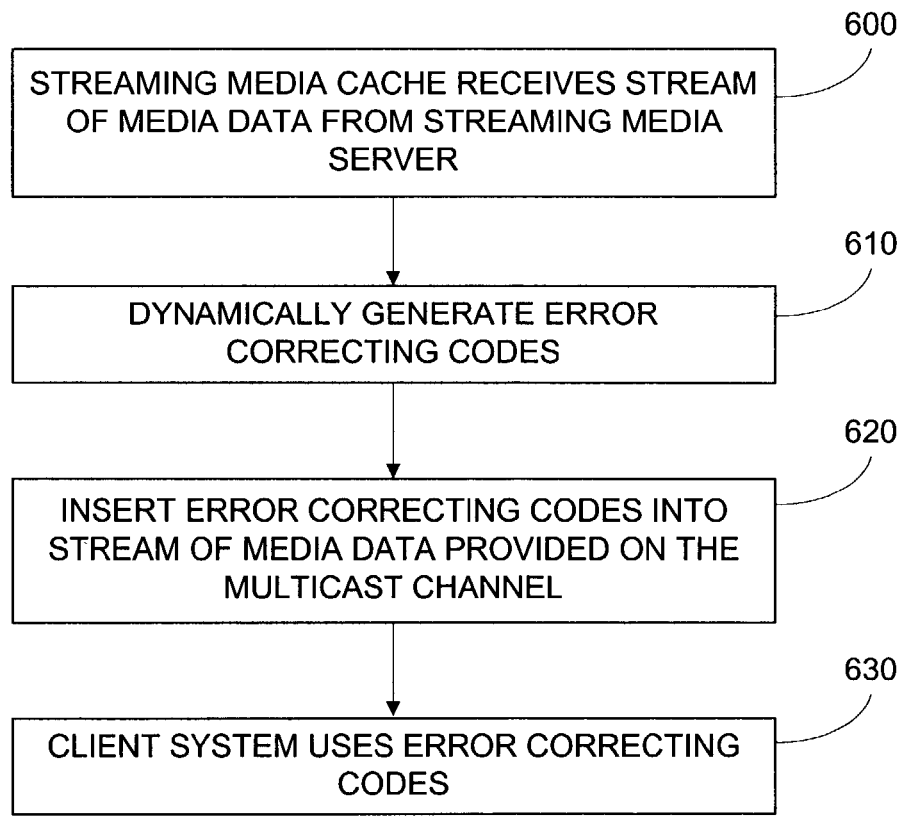
FIG. 6 illustrates a flow diagram according to an embodiment of the present invention.

FIG. 6 illustrates a flow diagram according to an embodiment of the present invention. In particular, this figures illustrate additional steps that may be performed in addition to FIGS. 4A-C and/or FIGS. 5A-B, above.

In the present embodiment, streaming media cache 20 receives the unicast of streaming media data from streaming media server 30, step 600. Next, after a particular number of streaming media packets have been received, streaming media cache 20 determines an error correcting code (ECC), step 610. For example, after every 10 packets of streaming media, streaming media cache 20 determines an ECC for those 10 packets. In other embodiments, ECCs for a greater or lesser number of packets is contemplated. Additionally, unicast meta data is determined and modified to become the multicast meta data.

After the ECC code is determined in this embodiment, the ECC is injected to the multicast stream, step 620. More particularly, the ECC for each set of packets is interspersed with the streaming media data that is output on the Multicast IP address. For example, 20 packets of streaming media data are output, an ECC is output, 20 packets of streaming media data are output, and the like. Additional modifications to multicast meta data and the multicast stream are envisioned.

In embodiments of the present embodiment, streaming media cache 20 calculates the ECC, and in other embodiments, streaming media cache 20 receives the ECC from streaming media server 30, or other source. The ECC used may be any conventional error correcting code algorithm. In this embodiment, the ECC is used by client systems to determine if the streaming media packets have been received correctly, step 630.

Figure 7A:
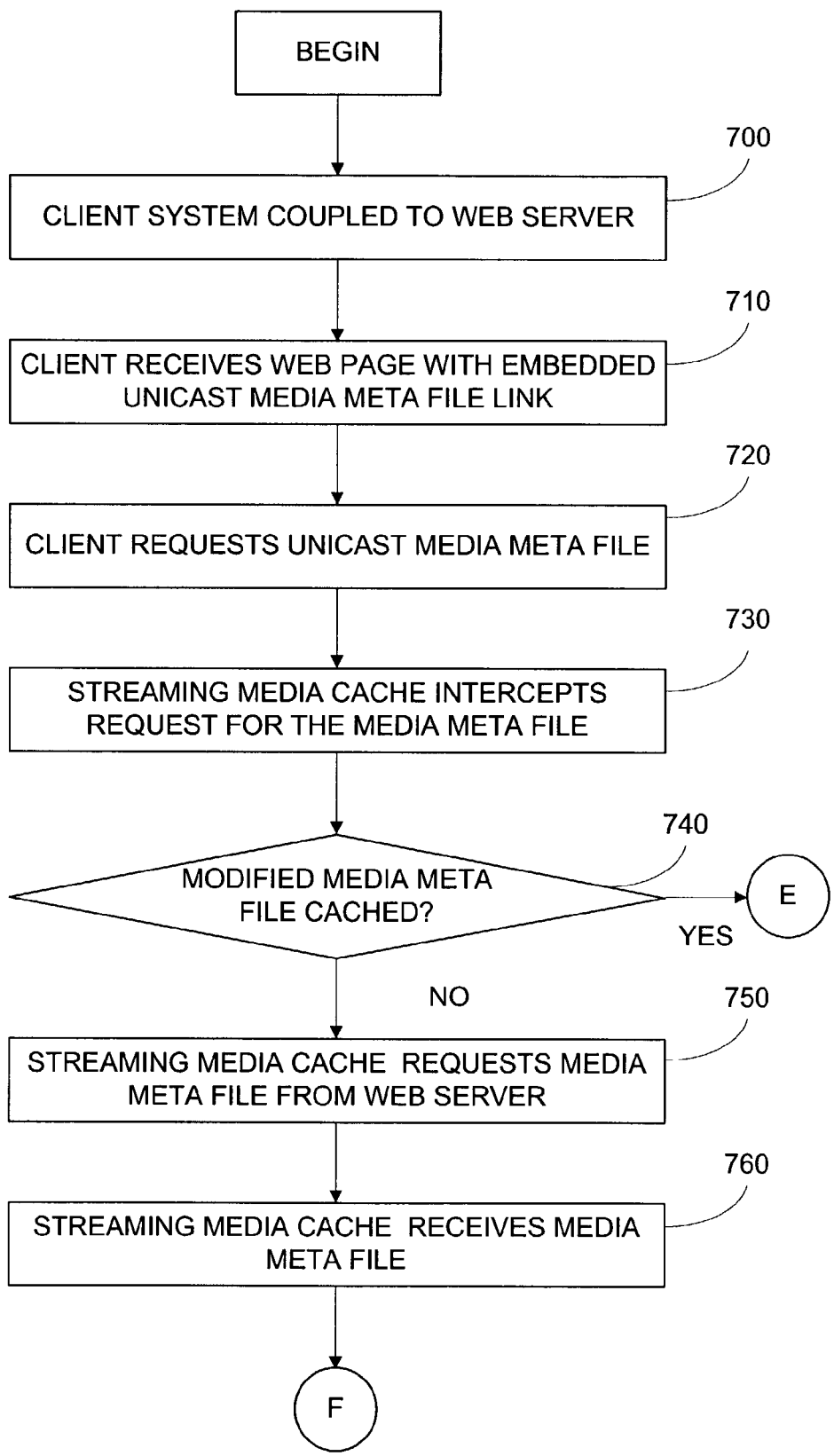
FIGS. 7A-D illustrate a flow diagram according to another embodiment of the present invention.
Figure 7B:
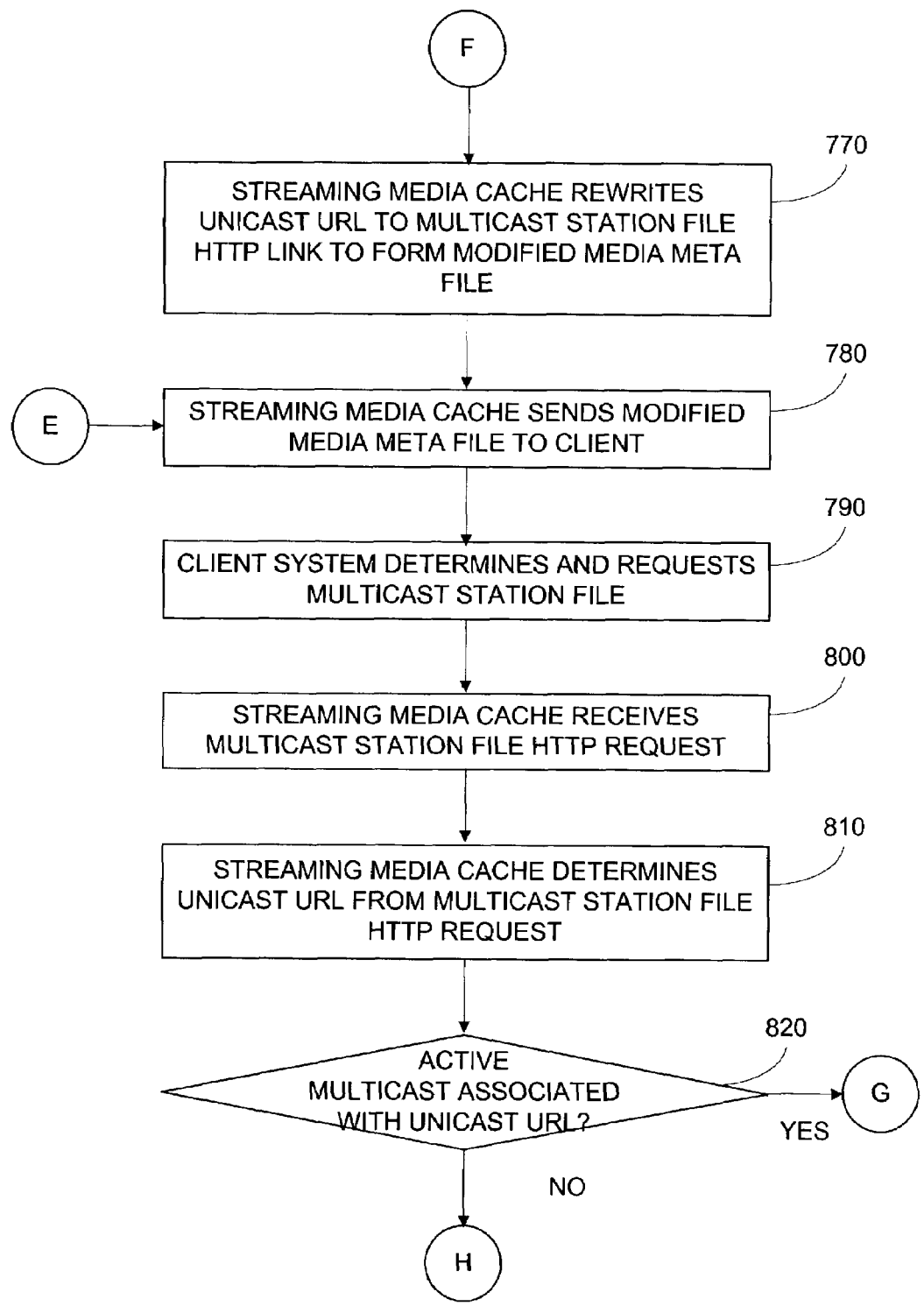
Figure 7C:
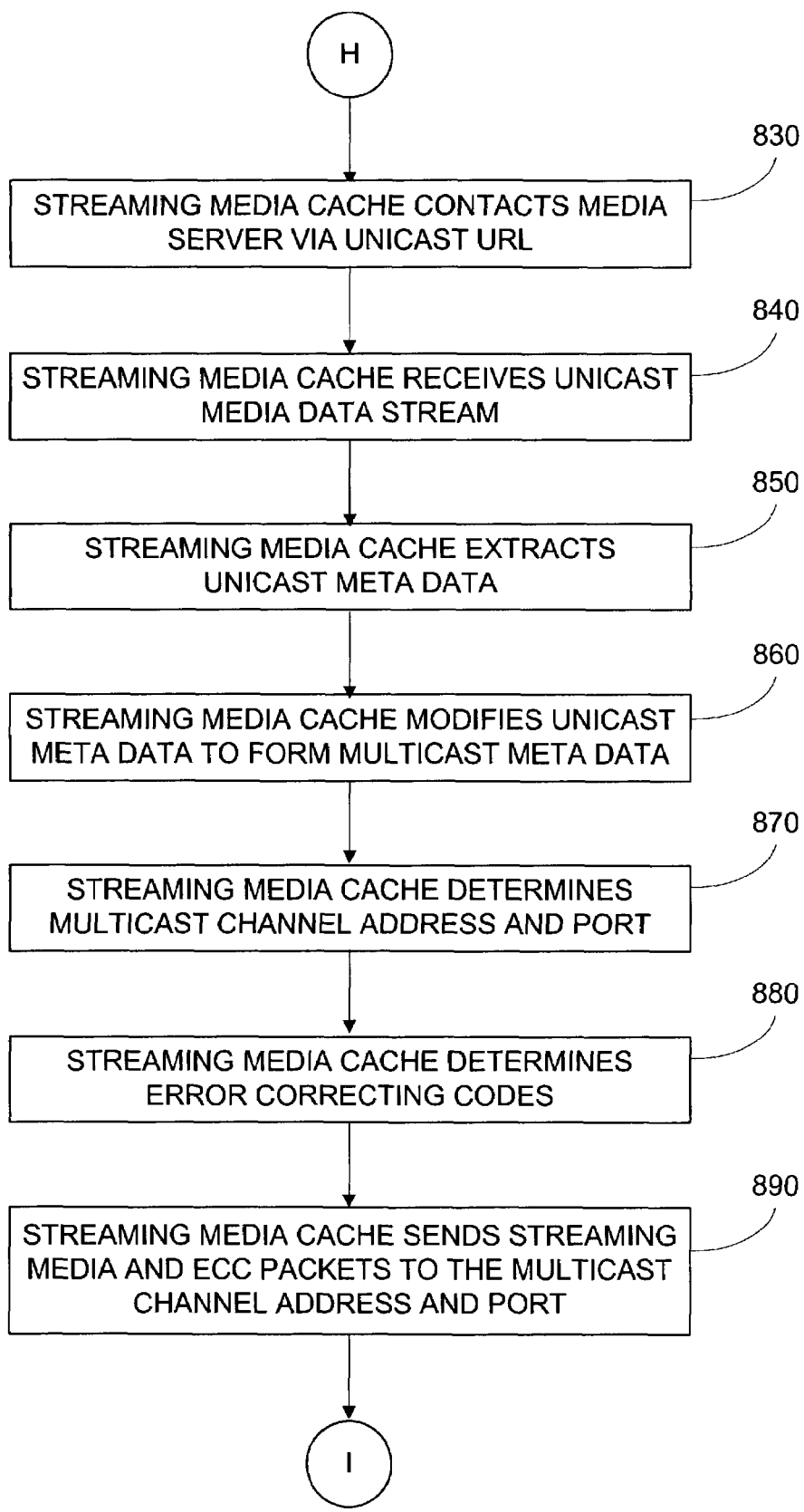
Figure 7D:
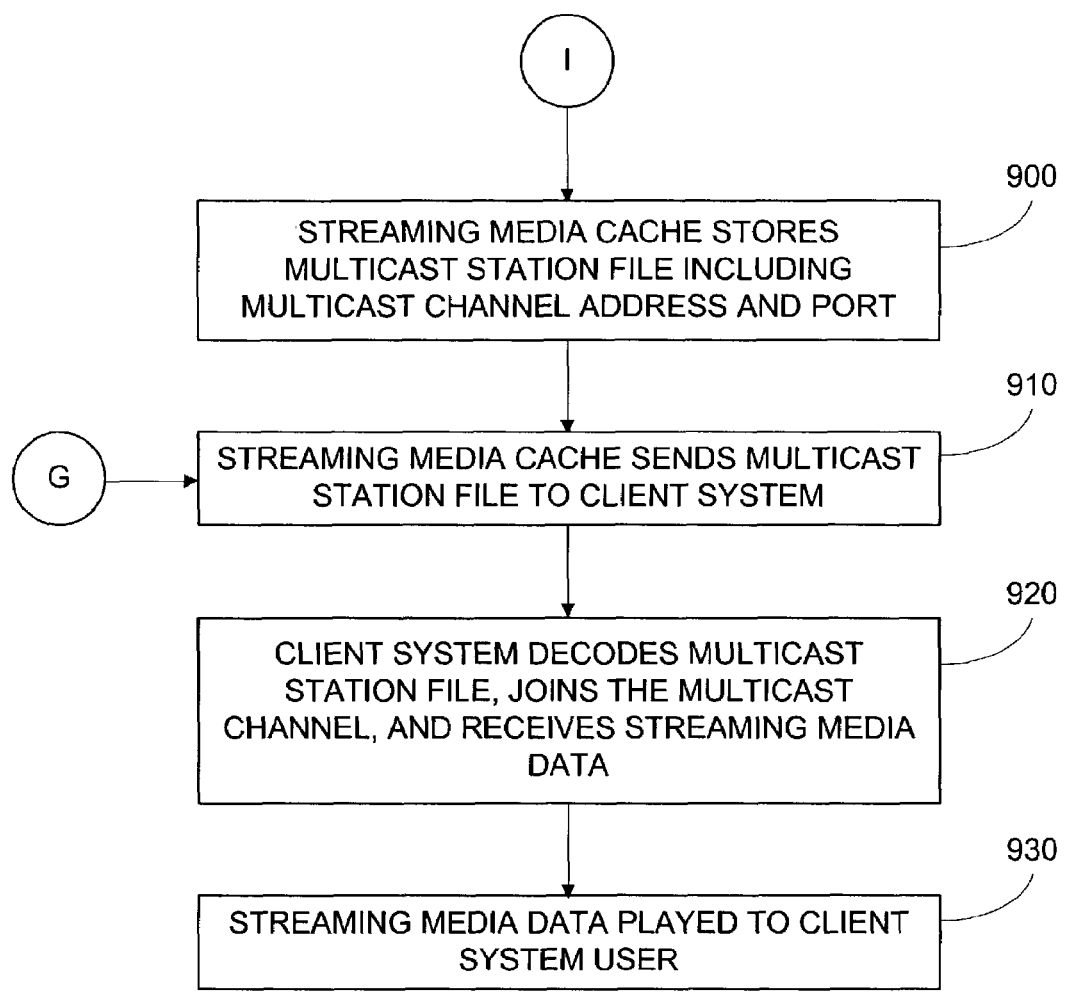

FIGS. 7A-C illustrate a flow diagram according to another embodiment of the present invention.

Initially, client system 110 requests a web page hosted by web server 100, step 700. In response, web server 100 provides the web page to client system 110 for display, typically via a browser on client system 110, step 710. Similar to the embodiment above, the web page may include a link to a media meta file. If the user wishes to view the streaming media, the user clicks upon the link to the media meta file (e.g. .asx, .rm), step 720.

In this embodiment, router 40 intercepts the request for the media meta file, and forwards the request to streaming media cache 20 and not directly to web server 100, step 730. Streaming media cache 20 then determines whether the modified media meta file is cached, step 740. If not, streaming media cache 20 generates a request for the media meta file from web server 100, step 750. Again, the media meta file may be resident on other servers than web server 100, such as another streaming media cache or other up stream server.

In the present embodiment, web server 100, or another server, provides the media meta file back to streaming media cache 20, step 760. Next, streaming media cache 20 rewrites the unicast URL in the media meta file to an HTTP link to a multicast station file to form the modified media meta file, step 770. In this example, streaming media cache 20 is again the web server for the multicast. As an example, a unicast URL may have the form: mms://abc.lab.netapp.com/stream1; the resulting multicast link may be written in the form: http://streaming-cache/abc.lab.netapp.com/stream1/NeTcAcHe.nsc. In this example, it is noted that the suffix "NeTcAc He.nsc" is added to help streaming media cache 20 quickly identify multicast requests as embodied in the present invention. In other embodiments, the suffix may be different. Additionally, the protocol (MMS→HTTP) is changed.

In this embodiment, streaming media cache 20 sends the modified meta file to client system 110, step 780. Next, in response to the modified media meta file, client system 110 determines and requests the multicast station file URL, step 790.

Next, router 40 forwards the client system request for the multicast station file to streaming media cache 20, step 800. In response, streaming media cache 20 determines the original unicast URL in response to the multicast station file URL, step 810. In the example above, the multicast station file is http://streaming-cache/abc.lab.netapp.com/stream1/NeTcAcHe.nsc and from it, streaming media cache 20 reconstructs the unicast URL: mms://abc.lab.netapp.com/stream1.

In the present embodiment, streaming media cache 20 determines whether there is an active multicast streaming session for the unicast URL, step 820. If not, based upon the URL of the unicast stream, streaming media server 20 invokes the URL link to contact streaming media server 30 and request the stream of media data, step 830. Next, streaming media cache 20 begins receiving the unicast streaming media, step 840. In embodiments of the present invention, streaming media cache 20 also stores the unicast streaming media, as described in the above referenced applications.

In the present embodiment, streaming media cache 20 extracts stream meta data from the unicast stream, step 850. In this embodiment, the meta data includes stream header information, bitrate, the number of packets in the stream, and the like. Based upon such data, streaming media cache 20 modifies the unicast stream meta data to form multicast stream meta data, step 860. In the present embodiment, multicast streaming media data includes different parameters such as including error correction packets, using multicast streaming bitrates derived from unicast streaming bitrates, and the like.

Next, streaming media cache 20 determines available multicast channel address/ports, step 870. In the present embodiment, error correction packets are then generated and inserted into the streaming media data based upon the received streaming media, step 880. For example, for typical multicast, one error correction packet is used for every 10 data packets. In other embodiments, different types of modifications may be made to the media stream.

In the present embodiment, streaming media cache 20 then provides the streaming media data along with the error correction packets received from streaming media server 30 (the upstream media source) onto the multicast IP address/port, step 890. In response, multicast router 130 provides the streaming media data to any client system that subscribes to the particular IP address.

In the present flow diagram, the actual media station file (e.g. .nsc) is then formed and stored within streaming media cache 20, step 900, and the media station file is forwarded to client system 110, step 910. In response to the media station file, client system 110 parses the media (multicast) station file and then joins or monitors the multicast channel, step 920.

The received streaming media data received on the multicast IP address is then typically played to the user, step 930. In the present embodiment, a number of different client-side media players may be used to play the streaming media data, including the Windows Media Player, RealNetworks RealPlayer, or the like.

In view of the above disclosure, many other variations can be envisioned. For example, different combinations of media meta files, modified media meta files, media station files, and the like may be used. For example, in one embodiment, the modified media meta file may include the contents of the media station files. As another example, different parameters may be specified in the media meta files and/or media station files, such as rights management data, or the like. In still other embodiments, different streaming media formats can be used, such as QuickTime, RTSP, or even combinations of the above.

The invention has been described in embodiments above as a file cache or a streaming media cache. It should be understood, however, that embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network (upstream servers) before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing streaming media data to a client system comprising:

receiving at a streaming media cache a request from a first client system for a media meta file associated with a stream of Microsoft Media Streaming (MMS) media data, the media meta file having information identifying the stream of media data including a unicast uniform resource locator (URL) for the stream of media data, the request being a request for a unicast connection to the stream of media data;

modifying the media meta file to replace the unicast URL of the media meta file with an IP multicast channel including a multicast IP address, a port number, and an indicator for a Windows Media stream format for the stream of media data;

sending the modified media meta file to the first client system in response to the request, the modified media meta file indicating the multicast channel for the stream of media data in place of the unicast URL for the media meta file;

determining whether the stream of media data is cached at the streaming media cache;

accessing the cached stream of media data if the stream of media data is cached at the streaming media cache; otherwise, accessing the stream of media data from a media server with the unicast URL; and providing the stream of media data on the multicast channel to provide access to the stream of media data to the first client system.

2. The method of claim 1, wherein the modified media meta file indicating the multicast channel comprises the modified media meta file having a specification of a multicast station file that specifies the multicast channel.

3. The method of claim 1, further comprising retrieving the media meta file from a media server that serves the stream of media data, and modifying the retrieved media meta file into the modified media meta file.

4. The method of claim 1, further comprising receiving a request from a second client system for the media meta file, and sending the modified media meta file to the second client system.

5. The method of claim 1, further comprising determining whether one or more clients are active on the multicast channel, and terminating the stream of media data on the multicast channel if no clients are determined to be active on the multicast channel.

6. The method of claim 1, further comprising caching the stream of media data, if the stream of media data is not already cached in the streaming media cache.

7. The method of claim 2, wherein the multicast station file further specifies the unicast URL.

8. The method of claim 4, wherein the request from the second client system comprises a unicast request for the media meta file associated with the stream of media data.

9. The method of claim 5, wherein providing the stream of media data on the multicast channel further comprises receiving the stream of media data on a unicast connection from a media server, and further comprising terminating the unicast connection from the media server if no clients are determined to be active on the multicast channel.

10. An article of manufacture comprising a computer-readable medium having code stored thereon to provide instructions to cause a network device to perform operations including:

receiving a request at a streaming media cache from a first client system for a media meta file associated with a stream of Microsoft Media Streaming (MMS) media data, the media meta file having information identifying the stream of media data including a unicast address for the stream of media data, the request being a request for a unicast connection to the stream of media data;

modifying the media meta file to replace the unicast address of the media meta file with an IP multicast channel indication for the stream of media data to generate a modified media meta file, the multicast channel indication including a multicast IP address, a port number, and an indicator for a Windows Media stream format for the stream of media data;

sending the modified media meta file to the first client system in response to the request for the unicast connection;

determining whether the stream of media data is cached at the streaming media cache;

accessing the cached stream of media data if the stream of media data is cached at the streaming media cache; otherwise, accessing the stream of media data from a media server with the unicast URL; and providing the stream of media data on the multicast channel to provide access to the stream of media data to the first client system.

11. The article of manufacture of claim 10, wherein the modified media meta file indicating the multicast channel comprises a media meta file compatible with one selected from the group consisting of a Windows media meta file and a Real media meta file.

12. The article of manufacture of claim 10, wherein the modified media meta file includes a specification of a multicast station file that specifies the multicast channel and the unicast address.

13. The article of manufacture of claim 10, wherein the multicast channel comprises an Internet Protocol (IP) address and the unicast address comprises a uniform resource locator (URL).

14. The article of manufacture of claim 10, further comprising receiving a request from a second client system for the media meta file, and sending the modified media meta file to the second client system.

15. The article of manufacture of claim 10, further comprising generating an Internet Group Management Protocol (IGMP) query, and sending the IGMP query to the first client system.

16. The article of manufacture of claim 10, further comprising identifying errors in the stream of media data, generating error correcting codes in response to identifying the errors, and sending the error correcting codes to the first client system.

17. The article of manufacture of claim 14, wherein the request from the second client system comprises a request for the multicast station file.

18. A method for receiving streaming media at a client system comprising:

sending a request to a web server for a media meta file associated with a stream of Microsoft Media Streaming (MMS) media data, the media meta file having information identifying the stream of media data including a unicast uniform resource locator (URL) for the stream of media data, the request for a unicast connection to the stream of media data from a media server;

receiving a modified media meta file from a media cache in response to the request, the modified media meta file indicating a multicast channel for the stream of media data in place of the unicast URL for the media meta file, the multicast channel of the modified media meta file being an IP multicast channel including a multicast IP address, a port number, and an indicator for a Windows Media stream format for the stream of media data, where the media cache provides access to a cached copy of the stream of media data if the media cache has cached the stream of media data, otherwise, the media cache accesses the stream of media data from the media server and provides access to the stream of media data; and accessing the stream of media data on the multicast channel.

19. The method of claim 18, wherein the modified media meta file includes the specification address of the multicast address, a port, a stream format, and the unicast URL.

20. The method of claim 18, further comprising receiving an error correcting code from the media cache.

* * * * *

UNITED STATES PATENT AND TRADEMARK OFFICE
CERTIFICATE OF CORRECTION

| | | |
|---|---|---|
| PATENT NO. | : 7,657,644 B1 | Page 1 of 1 |
| APPLICATION NO. | : 10/144454 | |
| DATED | : February 2, 2010 | |
| INVENTOR(S) | : Qinghua Zheng | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 998 days.

Signed and Sealed this

Thirtieth Day of November, 2010

David J. Kappos
*Director of the United States Patent and Trademark Office*